United States Patent [19]

Rappe

[11] 4,399,041

[45] Aug. 16, 1983

[54] PROCESS FOR PARTICULATE REMOVAL FROM COAL LIQUIDS

[75] Inventor: Gerald C. Rappe, Macungie, Pa.

[73] Assignee: International Coal Refining Company, Allentown, Pa.

[21] Appl. No.: 267,141

[22] Filed: May 26, 1981

[51] Int. Cl.³ .......................................... B01D 21/26
[52] U.S. Cl. .................................. 210/787; 210/806; 204/188
[58] Field of Search ............... 210/748, 787, 800, 801, 210/243, 512.1, 512.2, 785, 791, 804, 806; 204/188

[56] References Cited

U.S. PATENT DOCUMENTS

| | | | |
|---|---|---|---|
| 1,796,750 | 3/1931 | Eddy | 204/188 |
| 3,089,750 | 5/1963 | Samuelson et al. | 204/188 |
| 3,197,393 | 7/1965 | McEuen | 204/180 |
| 3,338,814 | 8/1967 | Given et al. | 210/512.2 X |
| 3,478,494 | 11/1969 | Lustenader | 55/127 |
| 3,559,811 | 2/1971 | Dahlberg | 210/512.2 |
| 3,764,008 | 10/1973 | Darley et al. | 210/512.2 X |
| 3,770,605 | 11/1973 | McCoy | 204/188 |
| 3,799,855 | 3/1974 | Franse | 204/188 |
| 3,799,857 | 3/1974 | Franse | 204/188 |
| 3,928,158 | 12/1975 | Fritsche | 204/188 |
| 3,974,073 | 10/1976 | Sze et al. | 210/800 X |
| 4,116,790 | 9/1978 | Prestridge | 204/188 |
| 4,285,805 | 8/1981 | Stegelman | 210/243 X |

OTHER PUBLICATIONS

"A Further Study of the Hydraulic Cyclone", *Chemical Engineering Science*, (1953), vol. 2, pp. 254–273.
"A Theoretical Study of the Hydraulic Cyclone", *Industrial Chemist*, (Sep. 1958), vol. 34, pp. 473–end.
"The TMC Door Clone – Aid to the Fluidized Catalytic Cracking Unit", Published by Door–Oliver Incorporated (reprint No. 4005).

*Primary Examiner*—Thomas G. Wyse
*Attorney, Agent, or Firm*—Mark F. Wachter

[57] ABSTRACT

Suspended solid particulates are removed from liquefied coal products by first subjecting such products to hydroclone action for removal in the underflow of the larger size particulates, and then subjecting the overflow from said hydroclone action, comprising the residual finer particulates, to an electrostatic field in an electrofilter wherein such finer particulates are deposited in the bed of beads of dielectric material on said filter. The beads are periodically cleaned by backwashing to remove the accumulated solids.

11 Claims, 2 Drawing Figures

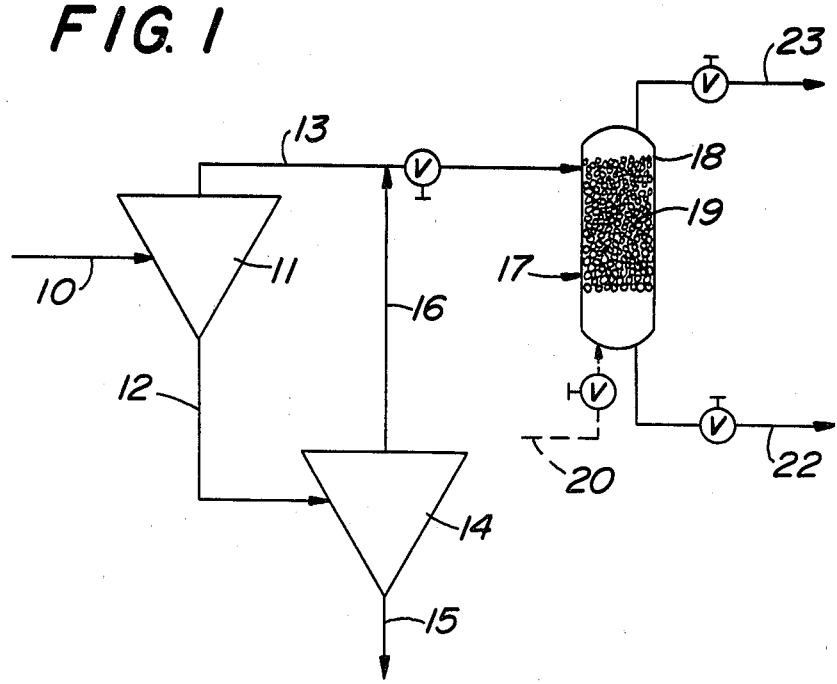
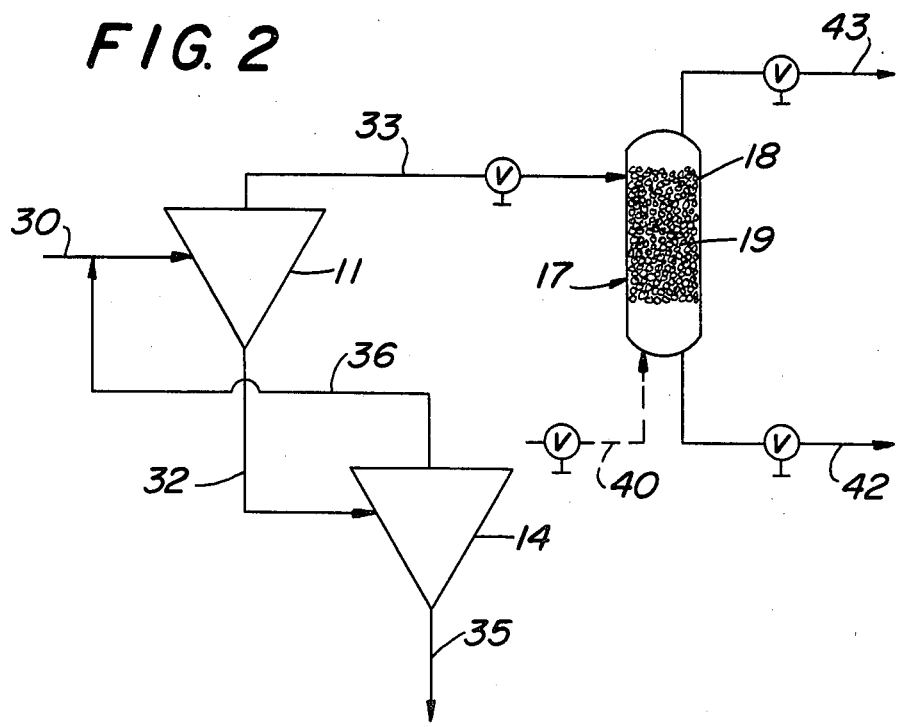

PROCESS FOR PARTICULATE REMOVAL FROM COAL LIQUIDS

The Government of the United States of America has rights in this invention pursuant to Contract No. DE-AC05-78OR03054 (as modified) awarded by the U.S. Department of Energy.

The present invention relates to the treatment of liquefied coal products and is particularly concerned with the removal of particulate solids from liquefied coal.

BACKGROUND OF THE INVENTION

Increased utilization of coal is of considerable present interest as one way to increase the supply of needed energy. Since burning of coal is mostly limited to large stationary facilities and is environmentally unacceptable due to high sulfur and ash levels, conversion of coal to produce a clean liquid has been undergoing an intensive research and development effort by private undertakings as well as under government sponsorship.

In direct coal conversion processes, such as the solvent refining of coal, the most difficult problem encountered in providing an acceptable liquefied coal product is the removal therefrom of the residual ash particulates and/or other contained solid particulates, such as finely divided insoluble carbonaceous particles, carried in the liquid product arising from the liquefaction process. Typically, the ash content of raw coal may range from about 5 to 12% by weight, depending upon the source of the coal. The particle size distribution of particulates from coal liquefaction reactors is not well defined but limited data indicate that the mass median particle diameter ranges from 3 to 15 microns.

PRIOR ART

Among the various means known to the art for the removal of particulate solids from dispersion in a fluid medium are filters of various kinds, centrifuges, hydroclones, and the like. As applied to solids removal from liquefied coal products, centrifuges must operate at low throughput to achieve acceptable clarity and are therefore uneconomical whereas filter operations on rotary drum pressure and leaf filters have resulted in severe blinding and poor mechanical reliability.

Hydroclones can accommodate liquid feeds of high solids concentration, as up to about 25 weight percent. However, these devices are ineffective in removing solid particles of a size below about 5 microns.

The removal of dispersed solid particles from a fluid medium has also been accomplished by use of electrofilters, which are effective in removing solid particles in the 0–10 micron range. However, these electrofilters cannot be used on feeds containing in excess of about 5% by weight of solid particles. Typical of the kinds of electrofilters known in the art are those described in U.S. Pat. Nos. 3,770,605; 3,799,857; 3,928,158, and patents cited therein.

SUMMARY OF THE INVENTION

It is the general object of the present invention to provide a system and method for the removal of particulate solids from dispersion in a liquid medium, wherein such solid contaminants may comprise in the range of about 5 to 10% by weight and include solid particles in the 0–50 micron range. More particularly, the invention is applicable to the removal of ash or mineral containing solid particles from a liquefied coal slurry feed employed in the solvent refining of coal, wherein the solid contaminants include ash and unconverted coal or carbon.

In accordance with the present invention the removal of the contained solid contaminants from liquefied coal is effected by first subjecting the liquefied coal product to centrifugal separation, as in a hydroclone, to remove the major portion of these solid contaminants. The residual finest particles, which may comprise chiefly particles of a size range of up to about a 5 micron maximum and perhaps some particles of up to about 10 microns, are then removed from the liquefied coal product by electrofiltration.

There is a synergistic effect of combining a hydroclone and an electrofilter for removal of ash containing solid particulates from a liquefied coal product of the indicated type. The solid particulates are comprised of minerals (such as $FeO$, $FeS$, $TiO_2$, $Al_2O_3$, $MgO$, $CaO$, $SiO_2$, $Na_2O$ and $K_2O$) and unconverted solid coal or carbonaceous matter. The hydroclone is a particle and density classifier. Since there is a particle size distribution, the denser components ($FeO$, $FeS$, $TiO_2$, $Al_2O_3$, $MgO$) will be preferentially collected in the underflow stream, and, therefore, the overflow streams will contain finer particles enriched in lower density solids. By way of illustration, the specific gravity of solid particulates from a Kentucky #9 coal from the Dotiki mine are presented in Table 1. Since the unconverted coal has a lower density than any of the ash components, the overflow will be enriched in unconverted carbon relative to the feed composition.

TABLE 1

Specific Gravity of Solid Particulates in Coal Liquid Products

| Compound | Spec. Grav. | Mineral Analysis (Approximate wt %) Ky9 Coal-Dotiki Mine |
|---|---|---|
| FeO | 5.70 | ⎫ 18.83 |
| FeS | 4.74 | ⎭ |
| TiO$_2$ | 4.26 | 1.37 |
| Al$_2$O$_3$ | 3.97 | 23.20 |
| MgO | 3.58 | 0.80 |
| CaO | 3.38 | 2.82 |
| SiO$_2$ | 2.20 | 47.51 |
| K$_2$O | 2.32 | 2.01 |
| Na$_2$O | 2.27 | 0.49 |
| Unconverted Carbon* | 1.70 | |
| Coal Liquid | 0.90 | |

*Ratio of unconverted carbon to ash = 0.5 to 1.0

The removal of the higher density components enhances the operation of the electrofilter. The presence of highly conductive solid particulates (i.e., the solids with a high dielectric constant) reduces the capacity of the electrofilter to accumulate solids. In accordance with this invention those solid components of the liquefied coal product which have high dielectric constants (see Table 2) are also the same components which have higher density and, therefore, are selectively and preferentially removed by the upstream hydroclone separations.

TABLE 2

Dielectric Constants of Solid Particulates in Coal Liquid Products

| Compound | Dielectric Constant |
|---|---|
| FeO | 14.20 |

TABLE 2-continued

| Dielectric Constants of Solid Particulates in Coal Liquid Products | |
|---|---|
|  | Dielectric Constant |
| $TiO_2$ | 86.00 |
| $Al_2O_3$ | 9.34 |
| MgO | 9.70 |
| CaO | 11.80 |
| $SiO_2$ | 4.50 |
| Components of Coal Liquids | |
| Chrysene | 3.46 |
| Pyrene | 3.80 |

In addition, the electrofilter will preferentially capture solids based on a difference in dielectric constant of the solids and the coal liquids. Therefore, mineral matter is preferentially removed leaving the carbonaceous solids to pass through with the coal liquid product. Since the unconverted coal solids are high in BTU value, the inclusion of this material in the coal liquid product increases recovery of fuel value.

The operation of the invention will be understood and certain of its advantages appreciated from the description which follows read in connection with the accompanying drawings.

BRIEF DESCRIPTION OF THE DRAWINGS

FIG. 1 is a schematic flow diagram of a system for separation of dispersed solids from a liquid medium in accordance with the invention.

FIG. 2 is a schematic flow diagram of a modified embodiment.

DETAILED DESCRIPTION

As depicted in FIG. 1, a liquefied coal slurry feed of the type employed in the solvent refining of coal and containing dispersed solids is introduced by line 10 into a first stage hydroclone system 11. Typically, a portion of the coal slurry has a boiling point greater than 850° F. In the first stage hydroclone system 11 separation takes place between an underflow portion 12 of higher solids content than the charge and an overflow portion 13 of reduced solids content. In the first separation stage the overflow-underflow ratio may generally be in the range of 0.8 to 1.2. Under these conditions, properly adjusted to maximize solids removal by not restricting the underflow discharge, 75–80% solids removal can be attained in the first hydroclone stage.

First stage hydroclone system 11 and a second stage hydroclone system 14 to be described hereafter, may consist of a plurality of hydroclones manifolded together as is well known in the art. To this end, hydroclone systems 11 and 14 may comprise conventional constructions such as those described in the following references: (1) "A Further Study of the Hydraulic Cyclone," *Chemical Engineering Science* (1953), Vol. 2, pp. 254-272; (2) "A Theoretical Study of the Hydraulic Cyclone," *Industrial Chemist* (Sept. 1958), Vol. 34, pp. 473-end; and (3) The TMC Dorr Clone-Aid to the Fluidized Catalytic Cracking Unit" published by Dorr-Oliver Incorporated (Reprint No. 4005).

The solids concentrate discharged from the first stage hydroclone by line 12, is introduced into a second stage hydroclone system, indicated at 14, wherein further separation takes place to provide a second stage underflow at 15 containing the major part of the initial particulate solids content of the initial charge introduced by line 10, and practically all of the particles of above about 5 micron size range. The overflow from the second stage hydroclone system discharged by line 16 is combined with the overflow from the first hydroclone stage in line 13 and the combined overflow products are subjected to further separation by electrofiltration.

The combined first and second stage overflows in lines 13 and 16 are introduced into an electrofilter system 17. The solids in this combined overflow, which are in a size range of up to about 10 microns, predominately in the 0–5 micron range, have been been preferentially depleted in mineral matter due to greater density of the ash components. The solids removed by the electrofilter are preferentially ash containing due to the higher dielectric constant of mineral matter relative to coal liquids. Thus the small amount of uncollected solids in the electrofilter filtrate are predominately carbonaceous.

The electrofilter system 17 may be comprised of a bank of electrofilters such as those described, for example, in U.S. Pat. Nos. 3,799,855; 3,799,857 and 3,928,158. In general, the electrofilter may be in the form of a cylindrical vessel 18 filled with monodisperse, uniform, smooth, glass spheres 19 whose diameter may range from one-sixteenth to one-half inch, preferably in the range of one-eighth to one-fourth inch. A d.c. power source (not shown) of 10–50 kV supplies power to a central or to multiple electrodes. The filter bed is grounded at a certain distance from the electrodes, thus creating gradients in the bed. The fine particulates are collected on the spheres. When the solids holding capacity of the bed has been reached, the power is shut off and a suitable backwashing liquid, preferably a coal derived solvent with a boiling point range of about 300° F. to about 850° F., is passed through the bed, by means indicated at 20. Typically, the volume of backwash liquid employed is equivalent to about two bed displacements (i.e., twice the void volume of the bed). Multiple modules are employed to provide an approximate continuous flow. Thus, while one or more of the electrofilters is on stream a companion spent electrofilter may be subjected to backwashing.

During flow into electrofilter bed 19 of the combined liquid overflows from lines 13 and 16, the collected filtered product is discharged via line 22. The recovered filtrate will generally comprise about 80% or more of the starting feed charged to the operation by line 10. This filtrate, under proper selection of operating conditions, should contain less than about 0.1% solid particulates.

During the backwashing of bed 19, with the electric power shut off, the wash effluent is discharged via line 23. The wash effluent will contain practically all of the residual particulate solids not removed through line 15 by the second stage hydroclone system 14, such residual solids being chiefly particles in the 0–5 micron range.

For efficient operation of the described system the feed stream to the electrofilter should not contain any free water and less than 1000 ppm dissolved water.

In general, operation of the systems illustrated in FIGS. 1 and 2 of the Drawings can achieve removal of 95–99+% of contained solids from a liquefied coal product having a feed solids concentration of 5–10% by weight. The solids-containing liquid feed is introduced at elevated temperature and pressure in the first stage to a bank of hydroclones at rates between 0.5 and 2.0 gallons per minute (gpm) per hydroclone (1.89 to 7.57 liters/min), preferably at 1.0 to 1.5 gpm per hydroclone (3.79 to 5.68 liters/min). The first stage hydroclone system 11 is adjusted to maximize solids removal by not restricting the underflow discharge. The temperature of the charge is adjusted to provide a liquid viscosity below 10 cp, preferably 1 cp or less. In the first hydroclone stage operation the overflow/underflow ratio may range from 0.8 to 1.2, under with conditions 75-80% solids removal can usually be expected. In the second stage hydroclone operation the objective is to maximize underflow concentration so as to minimize liquid product loss from the system. The overflow from the second stage can be combined with the first stage overflow (FIG. 1) is the combined overflow solids concentration is less than about 3 wt%, or recycled and combined with the feed in the first stage (FIG. 2) if the overall concentration exceeds 3 wt%.

For the initial removal of particulate solids from a liquefied coal product, the coal product is introduced to the first stage of the hydroclone system at a temperature such that the viscosity is not in excess of about 3 cp, since at higher viscosity the separation efficiency will be too low. Preferably, the temperature is selected to provide a viscosity not in excess of 1 cp, which can be attained at temperatures of about 600° F. (315° C.).

The pressure employed in operation of the hydroclones is not a limiting factor, so long as the initial pressure level is sufficiently above atmospheric to accommodate the pressure drop in each of the hydroclone stages and to prevent vaporization of the lower boiling point compounds of the liquid. The pressure drop per stage will be in the range of from about 40-80 psi (2.75-5.5 bars).

For the electrofilter operation, the temperature should be sufficiently high so that the viscosity of the charge thereto is below about 10 cp. Moreover, the selected temperature should be such that the liquid resistivity is in excess of $10^8$ ohm-cm. At lower resistivity the power consumption may be excessive. Pressure is not a significant variable in electrofiltration. The expected pressure drop for electrofilters of the type described, is of the order of about 15-30 psi (1 to 2 bars).

The system as depicted in FIG. 1 of the drawings is particularly suited for solids removal from a liquefied coal product of relatively low solids concentration, as for example one containing no more than about 5% by weight of suspended solids. For feeds having a relatively high solids concentration, interstage recycle should preferably be employed between the hydroclone stages, as illustrated, for example, in FIG. 2 of the accompanying drawings.

Referring to FIG. 2, the same general equipment is shown as in the previous embodiment, including the first stage hydroclone system 11, the second stage hydroclone system 14 and the electrofilter system 17. The liquefied coal is charged to the inlet of the first stage hydroclone by line 30, wherein it is separated into an underflow portion discharged through line 32 and an overflow portion discharged via line 33. The underflow portion in line 32 is fed to the second stage hydroclone system 14 and therein separated to provide an underflow portion in line 35 and an overflow portion in line 36. Underflow portion in line 35, which contains practically all of the particulate solids of above about 5 micron size, is discharged to downstream treatment, such as coking or gasification. The overflow portion in line 36 is recycled to join the fresh feed in line 30. The overflow product from the first stage hydroclone separation is conducted by line 33 to the electrofilter 17. In electrofilter 17 the residual fine particulate solids are removed by deposition in the bed of beads 19. As in the previous embodiment, electrical energy is supplied to filter 17 during flow of the liquid thereto and until the solids retaining capacity of the bed 19 is reached, at which time the power is shut off and a suitable backwash liquid is passed through the bed. Thus, during the onstream operation, the solids-free filtrate is discharged from filter 17 via line 42. During regeneration of bed 19, the backwash liquid is introduced by line 40 and the backwash effluent discharged through line 43.

The following Example 1 illustrates a practical operation for treatment of a liquefied coal product having a 5% or greater total solids concentration, using the flow arrangement of FIG. 1.

EXAMPLE 1

Each of the first and second stage hydroclone systems is comprised of a bank of (180 to 300) hydroclones, each hydroclone being of 10 mm diameter. The feed is introduced into the first stage hydroclone system at a temperature of 500° F. (260° C.) and at a pressure of 200 psi (13.8 bars), at a flow rate of 1.2 gallons per minute (4.54 liters/minute) per hydroclone. The liquid charge has a viscosity of 1.0 cp, a liquid density of 0.9 g/cm³ and solids density of 2.0 g/cm³. The median (by weight) particle size of the solids is 7.0 microns.

The combined overflows in lines 13 and 16 is charged to the electrofilter system at 450° F. (232° C.).

The flow distributions "F" and solids concentrations are set out in Table 3, wherein "F" equals flow rate, portion of feed, and "C" equals wt% solids.

TABLE 3

| Line 10 | | Line 12 | | Line 13 | | Line 15 | | Line 16 | | Line 22 | | Line 23 | |
|---|---|---|---|---|---|---|---|---|---|---|---|---|---|
| F | C | F | C | F | C | F | C | F | C | F | C | F | C |
| 1.0 | 5.0 | 0.5 | 8.0 | 0.5 | 2.0 | .0938 | 32.0 | .046 | 2.46 | .810 | .0987 | .096 | 20. |

Under the conditions of Example 1, 80% of the solids are removed in the first hydroclone stage and 75% of the solids contained in line 12 are removed in the second stage. The solids content of the combined streams entering the electrofilter 17 is 2.207 weight percent; 96% of which solids is removed by the subsequent electrofiltration.

The overall solids removal is 98.4% and the liquid $$\text{recovery} = \frac{\text{liquid in stream 22}}{\text{liquid in stream 10}} = \frac{\text{product}}{\text{feed}} = \frac{0.8102}{0.95} = 85.3\%$$

Example 2 illustrates the operation for treatment of a liquefied coal product having a solids concentration of 8% by weight. The temperatures and pressures employed are generally in the ranges heretofore described in the embodiment of Example 1.

The flow distribution and solids concentration are set out in Table 4.

TABLE 4

| | Line 30 | Line 32 | Line 33 | Line 35 | Line 36 | Line 42 | Line 43 |
|---|---|---|---|---|---|---|---|
| Relative Flow | 1.0 | 0.8125 | 0.8125 | 0.1875 | 0.625 | 0.7155 | 0.097 |

TABLE 4-continued

| Solids Conc. wt % | 8.0 | 9.846 | 2.462 | 32.0 | 3.2 | 0.0839 | 20.0 |
|---|---|---|---|---|---|---|---|

| Separation Efficiency | |
|---|---|
| Stage | % solids removal |
| 1st hydroclone | 80 |
| 2nd hydroclone | 75 |
| Electrofilter | 97 |
| Overall | 99.25 |

While the invention has been particularly described with reference to the treatment of liquefied coal products which ordinarily contain a fairly high solids concentration (in excess of about 5 weight percent) and include a substantial quantity of fine particles in the size range such that the mass median particle diameter is below about about 10 microns, the method of the invention may be employed to advantage in the treatment of other hydrocarbon liquids containing suspended solids presenting similar separation problems from the standpoint of solids concentration and particle size distribution.

What is claimed:

1. The method of removing suspended solid particulates contained in a liquefied coal product which consists essentially of the steps of:
   (a) subjecting said liquefied coal product as feed to a hydroclone treatment, thereby separating the said to obtain an under flow portion of substantially higher solids concentration than that of said feed and an overflow portion of lower solids concentration than that of said feed; said overflow portion containing at least the major part of the particles from said feed of the size range up to about 10 microns;
   (b) introducing said overflow portion into the electrostatic field of an electrofilter to deposit contained solids in said filter; and
   (c) discharging the solids-free liquid filtrate from said electrofilter.

2. The method as defined in claim 1 including the step of periodically regenerating said electrofilter by backwashing with a liquid stream to remove deposited solids therefrom, the supply of electrical energy to said filter being discontinued during said backwashing step.

3. The method as defined in claim 2 wherein said backwashing liquid is a coal derived solvent with a boiling point range from about 300° F. to about 850° F.

4. The method as defined in claim 1 wherein at least a portion of said liquefied coal product has a boiling point greater than 850° F.

5. The method as defined in claim 1 wherein said hydroclone treatment is carried out in two stages and wherein the underflow from said first stage is charged to said second stage; and the overflow from said second stage is combined with the overflow from said first stage, these combined overflow portions being charged to the electrostatic field of the electrofilter.

6. The method as defined in claim 1 wherein said hydroclone treatment is carried out in two stages and wherein the underflow from said first stage is charged to said second stage; the overflow from said second stage being recycled to the feed of said first stage and the overflow from said first stage being charged to the electrostatic field of the electrofilter.

7. The method as defined in claim 4 wherein said feed is introduced to the hydroclone treatment at a temperature such that the viscosity of the feed does not exceed 5 cp.

8. The method as defined in claim 4 wherein said feed is introduced to the hydroclone treatment at a temperature such that the viscosity of the feed does not exceed 1 cp.

9. The method as defined in claim 4 wherein the overflow product from the hydroclone treatment charged to electrofiltration is at a temperature sufficiently high to have a viscosity below 10 cp and such that the liquid resistivity exceeds $10^8$ ohms-cm.

10. The method as defined in claim 4 wherein said liquefied coal slurry is one obtained from a process for the solvent refining of coal.

11. The method as defined in claim 4 wherein said liquefied coal product has a mass median particle size of about 7 microns, a solids density of about 2 grams per cubic centimeter and a liquid density of about 0.9 grams per cubic centimeter; said product being charged to the hydroclone treatment at a temperature of about 500° F. and at a pressure of 200 psi.

* * * * *